No. 696,771. Patented Apr. 1, 1902.
J. M. SWEET.
RUBBER TIRE FOR VEHICLE WHEELS.
(Application filed Jan. 15, 1902.)
(No Model.)
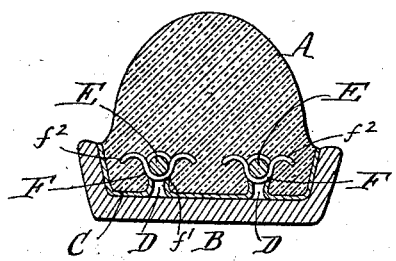
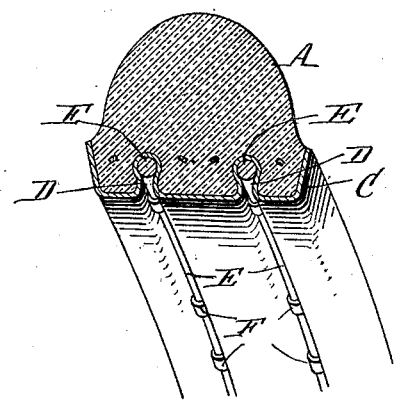
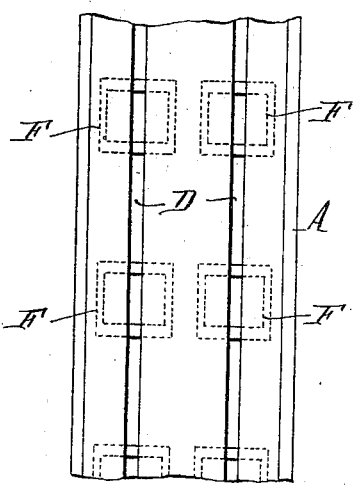
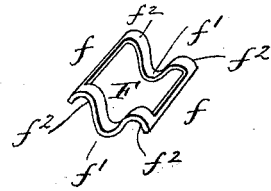
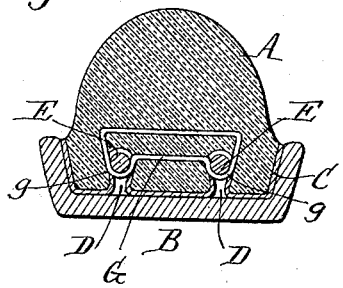
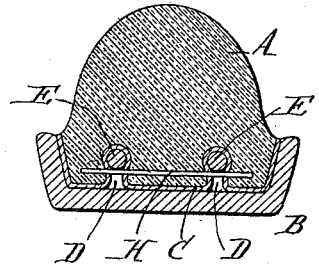
Witnesses:
E. A. Volk
Chas. W. Parker
John M. Sweet, Inventor.
By Wilhelm & Bonner
Attorneys.
THE NORRIS PETERS CO., PHOTO-LITHO., WASHINGTON, D. C.

UNITED STATES PATENT OFFICE.

JOHN M. SWEET, OF BATAVIA, NEW YORK, ASSIGNOR OF ONE-HALF TO FRANK RICHARDSON, OF BATAVIA, NEW YORK.

RUBBER TIRE FOR VEHICLE-WHEELS.

SPECIFICATION forming part of Letters Patent No. 696,771, dated April 1, 1902.

Application filed January 15, 1902. Serial No. 89,821. (No model.)

*To all whom it may concern:*

Be it known that I, JOHN M. SWEET, a citizen of the United States, residing at Batavia, in the county of Genesee and State of New York, have invented new and useful Improvements in Rubber Tires for Vehicle-Wheels, of which the following is a specification.

This invention relates to elastic or rubber tires for vehicle-wheels of that type which are retained in a channel metal rim by means of one or more longitudinal retaining wires, rods, bands, or the like.

The main object of the invention is to provide a simple, durable, and desirable tire to which the retaining-wires or the like can be readily applied or from which they can be easily removed for making repairs or for other reasons.

In the accompanying drawings, Figure 1 is a transverse section through a tire embodying the invention and showing the same applied to the channel-rim. Fig. 2 is a perspective view of a portion of the tire. Fig. 3 is a bottom plan view of the tire. Fig. 4 is a perspective view of one of the holding devices for the retaining-wires. Fig. 5 is a transverse section of a tire, showing a slightly-different holding device. Fig. 6 is a section of a tire, showing another slightly-modified holding device.

Like letters of reference refer to like parts in the several figures.

Referring particularly to Figs. 1 to 4, A represents the tire, which is made of vulcanized rubber or other suitable yielding or elastic material, and B represents the metal channel-rim, which is applied in any usual or well-known manner to the outer periphery of the wheel-felly and in the channel of which the tire is confined. The channel-rim shown in the drawings is provided with outwardly-diverging side flanges and the base or inner portion of the tire is shaped to properly fit the channel-rim. The outer or tread portion of the tire may be of any usual or desirable conformation. C represents the usual canvas or similar reinforcing material with which the base of the tire is preferably covered.

The base of the tire is formed with one or more, preferably two, open longitudinal grooves or channels D. The grooves or channels extend up into the base portion of the tire from the bottom face, or that face thereof which rests on the bottom of the rim-channel, and the reinforcing-canvas preferably follows the walls of the grooves or channels, so as to strengthen the same.

E represents the longitudinal retaining wires, rods, bands, or the like, of which there is one in each groove or channel D. The wires are arranged in the grooves beneath or outside of the reinforcing material and are held therein and connected to the tire by holding devices or pieces F. These holding devices are embedded or vulcanized in the material of the tire in forming the latter and may be of any suitable form adapted to take a firm hold on the material of the tire and span the groove or channel beneath or outside of the retaining-wires, so as to form holes or eyes through which the retaining-wires extend. As shown in Figs. 1 to 4, a separate series of these holding devices is provided for each groove, and each device is in the form of a rectangular frame or link having longitudinal side bars $f$ and transverse end bars, which latter are preferably bent to form semicircular central loops or seats $f'$, in which the retaining-wire engages, and oppositely-bent side portions $f^2$, which, together with the side bars $f$, are embedded in the material of the tire and take a very firm hold thereon. The holding devices can be readily formed by stamping out of sheet metal or from wire or the like. As will be seen from the drawings, the retaining-wire is confined in the groove or channel between the reinforcing covering material and the central end seats of the holding devices. Other forms of holding devices may be employed.

In Fig. 5 a slightly-different holding device is shown, which is in the form of a loop or link G, arranged transversely of and embedded in the base portion of the tire. The lower or inner bar of the loop is provided with curved seats $g$, which span the grooves or channels in the tire and form the eyes for the retaining-wires.

In the form of the invention shown in Fig. 6 the holding devices are in the form of straight transverse wires, strips, or bars H, which are embedded at their ends and central portions in the base of the tire at the sides of and between the grooves or channels. The holding devices are located sufficiently low in the tire to pass beneath the retaining-wires.

With the tire formed as described, the longitudinal retaining-wires can be threaded through the eyes or holes formed in the grooves by the holding devices rapidly and with ease, and they can also be easily removed when it is desired to replace a damaged wire. This is a great advantage over the tires in which the retaining-wires are passed through holes formed in the rubber. The grooves being formed in the under or inner side of the tire do not weaken the same and shorten the life of the tire, as in the cases where the grooves are formed in the sides of the tire, and owing to the described arrangement of the holding devices the retaining-wires are very strongly and permanently secured to the tire and the latter cannot be torn from the retaining-wires. Furthermore, as only the holding devices extend between the retaining-wires and bottom of the rim-channel the wires can be drawn very taut when securing the tire in the channel, and instead of being pulled away from the material of the tire above the wires they pull the latter in with them and compact or compress it in the rim-channel, thus making a very firm durable structure.

I claim as my invention—

1. An elastic tire for vehicle-wheels formed with an open longitudinal groove extending into the tire from the inner or bottom face thereof, holding devices secured to the tire and bridging said groove, and a retaining-wire or the like detachably seated in said groove and held therein by said holding devices, substantially as set forth.

2. The combination with a channel-rim, of an elastic tire arranged in said rim and provided with an open longitudinal groove which extends into the base portion of the tire from the inner or bottom face thereof, a retaining-wire or the like located in said groove, and holding devices secured to the tire and holding said retaining-wire or the like in said groove, substantially as set forth.

3. The combination with a channel-rim, of an elastic tire arranged in said rim and provided with an open longitudinal groove which extends into the base portion of the tire from the inner or bottom face thereof, a reinforcing-covering which is secured to said tire and which reinforces the walls of said groove, a retaining-wire or the like located in said groove beneath or outside of said reinforcing-covering, and holding devices secured to said tire and extending into said groove for holding the retaining-wire or the like therein, substantially as set forth.

4. The combination with a channel-rim, of an elastic tire arranged in said rim and provided with an open longitudinal groove extending into the base portion of the tire from the inner or bottom face thereof, a retaining-wire or the like located in said groove, and holding devices which are secured to the tire and span said groove, forming eyes or holes through which said retaining-wire or the like passes, substantially as set forth.

5. The combination with a channel-rim, of an elastic tire arranged in said rim and provided with an open longitudinal groove extending into the base portion of the tire from the inner or bottom face thereof, a retaining-wire or the like located in said groove, and holding devices secured to the tire, each in the form of a loop having one part thereof spanning said groove and forming therewith an eye or hole, substantially as set forth.

Witness my hand this 11th day of January, 1902.

JOHN M. SWEET.

Witnesses:
CHAS. W. PARKER,
JNO. J. BONNER.